US008830329B2

(12) United States Patent
Mao et al.

(10) Patent No.: US 8,830,329 B2
(45) Date of Patent: Sep. 9, 2014

(54) 3-D GLASSES WITH CAMERA BASED HEAD TRACKING

(75) Inventors: Xiaodong Mao, Foster City, CA (US); Richard Marks, Pleasanton, CA (US); Dominic Mallinson, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 345 days.

(21) Appl. No.: 13/246,674

(22) Filed: Sep. 27, 2011

(65) Prior Publication Data

US 2012/0088581 A1  Apr. 12, 2012

Related U.S. Application Data

(63) Continuation of application No. PCT/US2010/051827, filed on Oct. 7, 2010.

(51) Int. Cl.
*H04N 13/00* (2006.01)
*G06K 9/00* (2006.01)
*H04N 13/04* (2006.01)

(52) U.S. Cl.
CPC ..... *G06K 9/00281* (2013.01); *A63F 2300/1093* (2013.01); *H04N 13/0468* (2013.01); *H04N 13/0438* (2013.01); *H04N 13/0429* (2013.01)
USPC .......................................... 348/169; 348/164

(58) Field of Classification Search
USPC .................................. 348/164, 169
See application file for complete search history.

(56) References Cited

U.S. PATENT DOCUMENTS

| 4,884,876 | A | 12/1989 | Lipton et al. |
|---|---|---|---|
| 4,907,860 | A | 3/1990 | Noble |
| 5,192,960 | A | 3/1993 | Komamura |
| 5,805,205 | A | 9/1998 | Songer |
| 5,821,989 | A | 10/1998 | Lazzaro et al. |
| 5,870,636 | A | 2/1999 | Sugita et al. |
| 6,057,811 | A | 5/2000 | Edwards |
| 6,727,867 | B2 | 4/2004 | Divelbiss et al. |
| 6,857,739 | B1 | 2/2005 | Watson |
| 7,777,778 | B2 | 8/2010 | Scharenbroch et al. |
| 2002/0101988 | A1 | 8/2002 | Jones |

(Continued)

FOREIGN PATENT DOCUMENTS

| DE | 19533767 A1 | 3/1997 |
|---|---|---|
| EP | 881844 B1 | 7/2002 |
| JP | 9135400 A | 5/1997 |
| WO | WO 96/18925 A1 | 6/1996 |

(Continued)

OTHER PUBLICATIONS

International Search Report (ISR) and Written Opinion mailed on Dec. 3, 2010, for PCT Application No. PCT/US2010/051827, filed Oct. 7, 2010, 8 pages.

*Primary Examiner* — Sath V Perungavoor
*Assistant Examiner* — Jeffery Williams
(74) *Attorney, Agent, or Firm* — Kilpatrick Townsend & Stockton LLP

(57) ABSTRACT

Methods, devices, and systems, are described for tracking a video game player's head under different ambient lighting conditions and switching between tracking techniques as lighting conditions change. Based on measurements of ambient lighting conditions, a camera hooked to a game console can (1) track a player's face using facial tracking techniques, (2) track reflective material on the player's 3-D glasses, or (3) turn on or up illumination LEDs mounted on the 3-D glasses.

12 Claims, 7 Drawing Sheets

(56) References Cited

U.S. PATENT DOCUMENTS

| | | |
|---|---|---|
| 2002/0122145 A1 | 9/2002 | Tung |
| 2002/0186348 A1 | 12/2002 | Covannon et al. |
| 2005/0116881 A1 | 6/2005 | Divelbiss et al. |
| 2006/0012974 A1 | 1/2006 | Su |
| 2008/0062259 A1 | 3/2008 | Lipton et al. |
| 2010/0007582 A1 | 1/2010 | Zalewski |
| 2010/0177174 A1 | 7/2010 | Ko et al. |

FOREIGN PATENT DOCUMENTS

| | | |
|---|---|---|
| WO | WO 9618925 A1 * | 6/1996 |
| WO | WO 99/23524 A1 | 5/1999 |
| WO | WO 02/059691 A2 | 8/2002 |
| WO | WO 02/080579 A2 | 10/2002 |
| WO | WO 2008/056180 A2 | 5/2008 |
| WO | WO 2010/062601 A1 | 6/2010 |
| WO | WO 2010062601 A1 * | 6/2010 |

* cited by examiner

CAMERA VIEW           COMPUTER DISCERNS

3-D GLASSES WITH CAMERA BASED HEAD TRACKING

CROSS-REFERENCES TO RELATED APPLICATIONS

This application is a "bypass" continuation of and claims priority to International Application No. PCT/US2010/051827, filed Oct. 7, 2010, which is incorporated by reference in its entirety for all purposes.

This application is related to U.S. application Ser. No. 13/260,701, filed Sep. 27, 2011, which is the National Stage of International Application No. PCT/US2010/051836, filed Oct. 7, 2010, which are incorporated by reference in their entireties for all purposes.

BACKGROUND

1. Field of the Invention

Embodiments of the present invention relate to camera-based head tracking in general and, in particular, to camera-based head tracking in various lighting conditions for use with 3-D video display and video game entertainment devices.

2. Description of the Related Art

Video games have become more immersive as technology progresses. Video game consoles are often produced with state-of-the-art processors, extremely fast memory, and high-end graphics cards. Input controllers have evolved from simple knobs, joysticks, and button-based controllers to accelerometer-enabled controllers that a user can swing in his or hands or wear. Further input technologies involve a camera, usually mounted on top of a television, tracking a user's body, including tracking his or her head, torso, arms, and legs. Users can control such video games by simply moving their bodies or parts thereof. For example, a player of a skateboarding game can duck down so that he or she clears an virtual bridge.

Three-dimensional (3-D, or 3D) televisions help immerse users in events happening on their display screens. For such 3-D televisions, a user sometimes dons 3-D glasses. Earlier 3-D glasses included red and blue lenses for discerning an anaglyph. Shuttered 3-D glasses have lenses that rapidly and alternatingly switch between being opaque and transparent in synchronization with a display that rapidly shows left and right images. Other types of 3-D presentation technology exist. Many are similar in that they present a separate two-dimensional image to a viewer's left eye and a separate two-dimensional image to the viewer's right eye either contemporaneously or very rapidly (e.g., at 60 Hz) in order to trick the viewer's brain into interpreting the stereoscopic images as a 3-D environment.

Video games utilizing 3-D display technologies can immerse a player in a game through the use of 3-D effects on the screen. Furthermore, video game consoles with body tracking can use 3-D effects to coordinate a player's actual movements in the real world with his or her virtual movement in a displayed virtual world. Head tracking can be critical for games that render based on where a user's head is. For example, as a user steps toward the television in his living room, a video game console can render a 3-D virtual pyre on the television so that it appears like he moves closer to it.

Thus, tracking the location, orientation, and movement of a viewer or other user's head can be important for some video games, especially those that use head-tracking to render 3-D objects closer to the user. There exists a need in the art for more robust head tracking that is not too expensive for average consumers.

BRIEF SUMMARY

Methods, devices, and systems of the present disclosure are related to camera-based head tracking of a user wearing glasses such as 3-D glasses for a 3-D television. In bright lighting, a camera tracks the user's head using face tracking software. In medium lighting, the camera tracks the user's head via reflective stickers or other material on the glasses, using available light. In dim to no-light conditions, the camera tracks the user's head via reflective material, such as retroreflectors, on the glasses that is illuminated by light emitting diode (LED) lights. The LEDs can be remotely controlled from a video game console or other head tracking system depending on the dearth or surplus of ambient light.

Technical advantages of the methods, devices, and systems herein include face tracking in a variety of lighting conditions that can be robust yet simple enough for mass production. Existing 3-D glasses can be retrofitted with reflective tape or other reflective material, and video game consoles with existing head tracking algorithms software can be reprogrammed by software or firmware updates. In light that is less conducive to facial tracking, such as from lamps that flicker or those with filaments that have odd color peaks, switching to tracking reflective tape on the glasses can be automatically or manually triggered in conjunction with ambient lighting conditions to improve the 'quality of service'(QoS) of the head tracking For example, a presenter who is demonstrating a new video game on a dark stage of a theater can trigger tracking through reflective tape. As another example, a presenter who is demonstrating the same video game on a brightly lit coliseum stage under sodium-based lights can trigger facial tracking techniques.

An embodiment of the present disclosure relates to a method for improving camera tracking of a user's head, including tracking, using a camera, a user's head by resolving facial features of the user, measuring a first ambient light level, determining that the first ambient light level is beyond a threshold value, tracking, using the camera, the user's head by detecting light reflected from glasses that the user is wearing, and switching, based on the determination that the first ambient light level is beyond the first threshold value, between tracking the user's head by resolving facial features and tracking using detected light reflected from the glasses. The method can further include outputting a position, orientation, or motion of the user's head based on the trackings.

An embodiment relates to a system for tracking a user's head, including a camera, a pair of glasses, and a processor operatively coupled to the camera, the processor operable to track a head of a user using a facial tracking algorithm, track the head by detecting reflected light from the pair of glasses when worn on the user's face, and switch, based on a first threshold of ambient light, between tracking using the facial tracking algorithm and tracking using the reflected light from the pair of glasses.

An embodiment relates to a method for improving camera tracking of a user's head, the method including tracking, using a camera, a user's head by detecting light reflected from glasses that the user is wearing, measuring a first ambient light level, determining that the first ambient light level is beyond a first threshold value, and switching on or off a light configured to illuminate the glasses based on the determination that the first ambient light level is beyond the first threshold value.

An embodiment relates to a system for tracking a user's head, including a camera, a pair of glasses, a light configured to illuminate the glasses, and a processor operatively coupled to the camera, the processor operable to track a head of a user by detecting reflected light from the pair of glasses when worn on the user's face, and switch, based on a threshold of ambient light, on or off the light.

An embodiment relates to a method for improving camera based head tracking of a user, the method including tracking, using a camera, a user's head by resolving facial features of the user, measuring a first ambient light level, determining that the first ambient light level is beyond a first threshold value, tracking, using the camera, the user's head by detecting light reflected from glasses that the user is wearing, and switching between tracking the user's head by resolving facial features and tracking using detected light reflected from the glasses. The method further includes measuring a second ambient light level, determining that the second ambient light level is beyond a second threshold value, and turning on or off a light used to illuminate the glasses based on the determination that the second ambient light level is beyond the second threshold.

Optionally in the embodiment, the first ambient light level is determined to be below the first threshold value, the switching is from tracking by resolving facial features to tracking using detected light reflected from the glasses, the second ambient light level is determined to be below the second threshold value, and the light is turned on. As another option to the embodiment, the first ambient light level is determined to be above the first threshold value, the switching is from tracking using light reflected from the glasses to tracking by resolving facial features, the second ambient light level is determined to be above the second threshold value, and the light is turned off.

Other embodiments relate to machine-readable tangible storage media and computer systems which store or execute instructions for the methods described above.

BRIEF DESCRIPTION OF THE DRAWINGS

A further understanding of the nature and advantages of the present invention may be realized by reference to the following drawings. In the appended figures, similar components or features may have the same reference label.

The figures will now be used to illustrate different embodiments in accordance with the invention. The figures are specific examples of embodiments and should not be interpreted as limiting embodiments, but rather exemplary forms and procedures.

DETAILED DESCRIPTION

The present disclosure is related to tracking a user's head using a camera. The tracking can be in conjunction with 3-D video games, 3-D movies, television shows, or other videos, or other situations for which head tracking is desired (e.g., fighter jet pilot head tracking). In bright lighting, a camera tracks a user's head using facial tracking algorithms. In medium lighting, the camera tracks the user's head via reflective material integrated with or adhered to the glasses, using available light. In dim to completely dark conditions, the camera tracks the user's head via the same reflective material on the glasses but with the reflective material being illuminated with small lights, such as LEDs.

Having multiple LEDs mounted on the corners of glasses frames, such as two LEDs on the left and right corners of the frames, can illuminate reflective material on the glasses. The LEDs' brightnesses can be remotely controlled by a host console, such as a video game console. Under very dark conditions if the camera fails to detect the reflective material, it can remotely turn on each LED separately and adjust the brightness. The surface reflection can be boosted by having each LED mounted so that it slightly sticks out from the front of the frame and shines back onto the shiny frame surface. In some embodiments, the brightness is carefully balanced so as to not be so bright to disturb the user's experience but with good reflection able to be detected by the camera.

Under very strong lighting conditions, the detection of reflected glass frames may fail. However, the camera can then track the head by traditional face detection techniques, such as by detecting facial feature points. This can be quite robust given good lighting conditions.

A controller integrated with or separate from the camera can provide QoS control to seamlessly detect the lighting condition in many living room environments based on camera inputs and: (a) enable facial-feature detection/tracking if lighting is so strong that the detection of glass frame reflections would fail, (b) be based on glasses frame reflection to detect head motion in low light, and (c) light up miniature LEDs and adjust their brightness to boost up frame reflection if it is too dark. This QoS can be automatic by the controller unit without user interaction or can be set by a user.

In some embodiments, the detected head motion can be utilized to feed an in-game camera to enhance a viewer/player's 3-D viewing experience. In other embodiments, the detected head motion can be utilized for inputs to the video game.

Figure 1:
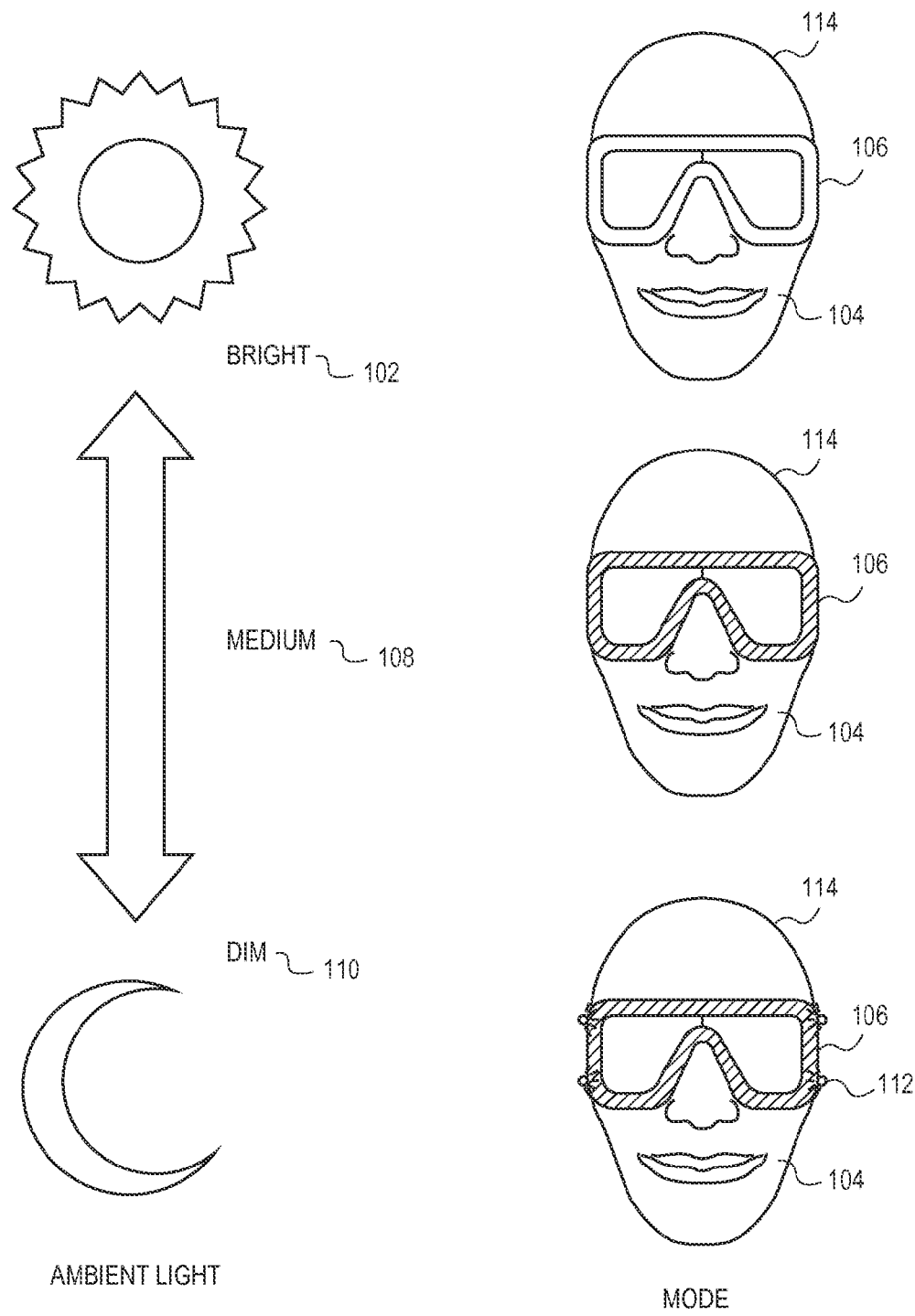
FIG. 1 illustrates head tracking methods in multiple lighting scenarios in accordance with an embodiment.

FIG. 1 illustrates head tracking methods in multiple lighting scenarios. In bright ambient light 102, user's head 114 is tracked by facial tracking algorithms that track user's face 104. A user may or may not don glasses 106 in this situation. In medium ambient light 108, user's head 114 is tracked solely by tracking reflected light from glasses 106. In dim light 110 or no light, user's head 114 is tracked by tracking reflected light from glasses 106, the reflected light first emanating from four LEDs 112 mounted on glasses 106.

Figure 2:
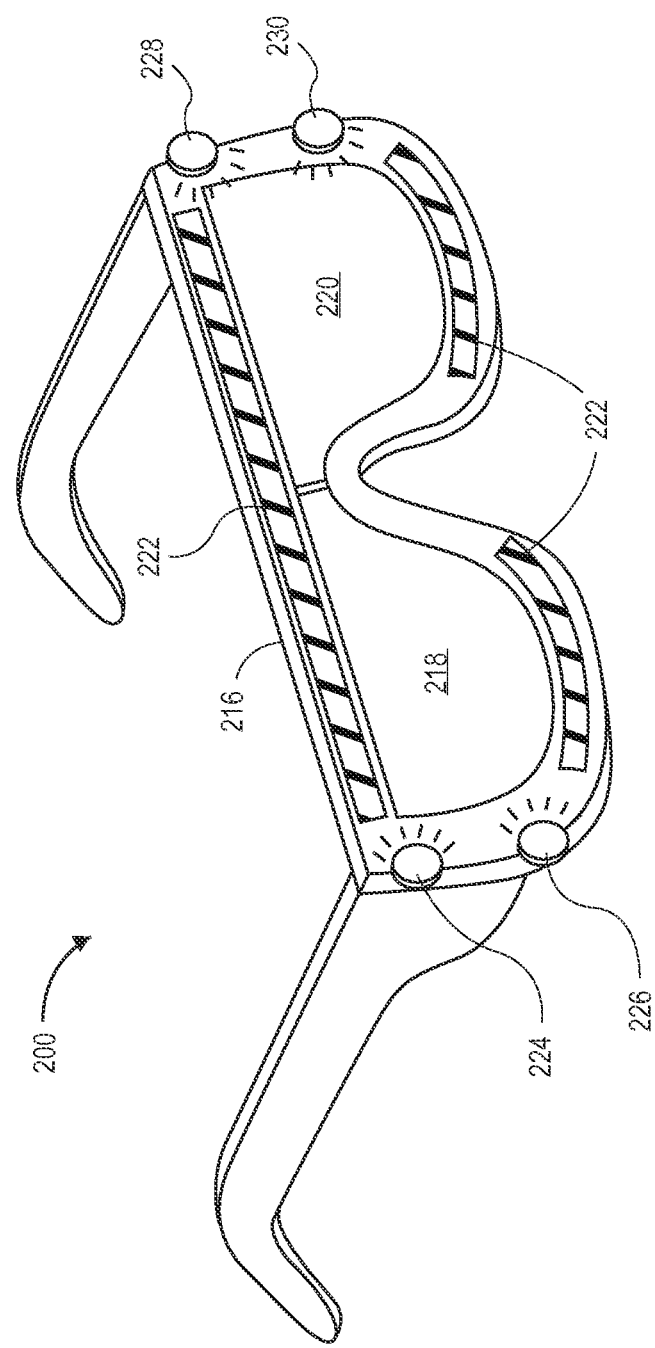
FIG. 2 illustrates 3-D glasses in accordance with an embodiment.

FIG. 2 illustrates a pair of 3-D glasses in accordance with an embodiment. Although non-3-D glasses can certainly be used, this description will hereon refer to 3-D glasses. 3-D glasses 200 include frame 216, right lens 218, and left lens 220. Right and left lenses 218/220 can shutter between transparent and opaque in sync with a 3-D display, such as a 3-D television. 3-D glasses 200 include highly reflective surfaces 222. Highly reflective surfaces 222 can include reflective tape that is adhered to premade frames, paint that is applied to existing frames, or a surface that is integrated with the material of the frames.

"Highly reflective" material includes material with greater than normal reflectivity, including white and/or silvered paints and beaded-type and microprismatic sheeting. Highly reflective material includes reflective tapes and sheeting that are compliant with amendments to the international Convention for Safety of Life at Sea (SOLAS) 74/83, American Society for Testing and Materials (ASTM) D4956, and/or U.S. Department of Transportation specifications for reflectivity. Retroreflectors can be used as highly reflective material in strips or other patterns on the glasses.

3-D glasses 200 include right upper light 224, right lower light 226, left upper light 228, and left lower light 230. Lights 224, 226, 228, and 230 are configured to shine onto reflective material 222 by sticking out from the front 3-D glasses 200 and shining back onto frames 216.

In the exemplary embodiment, lights 224, 226, 228, and 230 can be individually controlled so as to provide different intensities of light at various times to highly reflective surfaces 222. For example, a low level of light can be created by turning on or illuminating light 224 while keeping lights 226, 228, and 230 off. A slight increase in light can be created by turning on light 228 in addition to light 224, while keeping lights 226 and 230 off. Lights 226 and 230 can be similarly lighted in stages to provide five levels of illumination (i.e., no lights on, one light on, two lights on, three lights on, and four lights on). Furthermore, each light can be dimmed as necessary to create an almost infinite selection of light levels within a range.

Lights 224, 226, 228, and 230 can be individually controlled so as to avoid distracting the wearer of the glasses. For example, at the instant when 3-D glasses left lens 220 is shuttered 'closed' or opaque, lights 228 and 230 can be switched on. When left lens 220 is shuttered 'open' or transparent, lights 228 and 230 can be switched off. Similarly, lights 224 and 226 can be turned on when right lens 218 is opaque and turned on when right lens 218 is transparent. The duty cycles of the lights are thus synched with their proximate lenses. Not only can this avoid distracting the wearer of glasses 220, but the duty cycle can reduce power required to illuminate the lights.

Glasses can have light guide plate (LGP) material, such as polymethyl methacrylate (PMMA), to convey light from the LEDs throughout the frame. The lights can be aimed directly into the LGP as 'edge lit' LEDs instead of shining over the front of the frames. The LGP can be colored or uncolored and faintly disperse light so that the entire frame is lit. Different colors can represent different players to a camera. The related application Ser. No. 13/260,701 titled "3-D Glasses With Illuminated Light Guide" shows different configurations for glasses that can be used in embodiments herein.

To further reduce distractions to the wearer, lights 224, 226, 228, and 230 can be near-infrared LEDs that are visible to common charged-coupled device (CCD) cameras but invisible to the naked eye. In that way, the light reflected from highly reflective surfaces 222 can be seen by the camera but not to the user.

Figure 3:
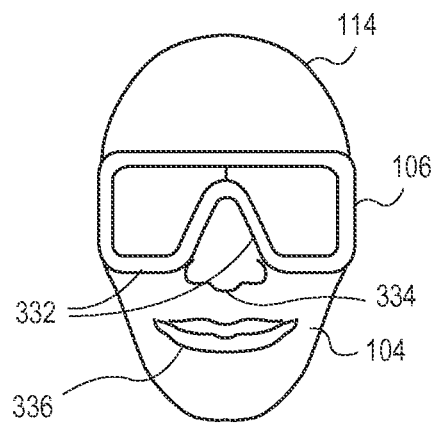
FIG. 3 illustrates a view of a brightly lit user's face in accordance with an embodiment.

FIG. 3 illustrates a view of a brightly lit user's face. User's head 114 and/or face 104 are illuminated by the sun, normal office-level room lighting (e.g., greater than 100 lumens per square foot), or other relatively bright lighting conditions. User's face 104 has facial features such as eyes 332 (occluded in the figure by 3-D glasses 106), nose 334, and mouth 336. Other facial or head features can be tracked as known in the art. For example, a user's ear lobes may be tracked along with other features.

Figure 4:
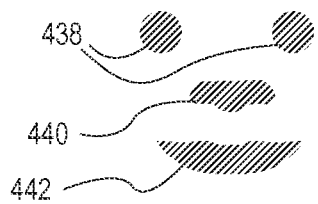
FIG. 4 illustrates facial recognition features of FIG. 3 as discerned by a computer in accordance with an embodiment.

FIG. 4 illustrates facial recognition features of FIG. 3 as discerned by a computer. Eye areas 438 are correlated with eyes 332, nose area 440 is correlated with nose 334, and mouth area 442 is correlated with mouth 336. Other methods and features for facial tracking are contemplated, and one of skill in the art would recognize the applicability of facial tracking algorithms in light of this disclosure.

Figure 5:
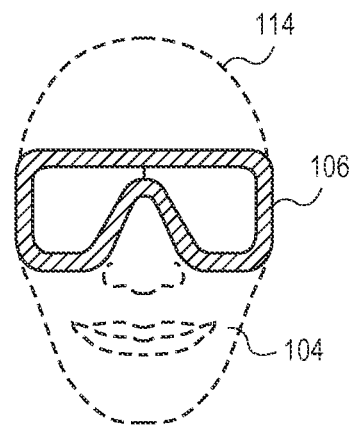
FIG. 5 illustrates a view of a dimly lit user's face with glasses in accordance with an embodiment.

FIG. 5 illustrates a view of a dimly lit user's face with glasses. User's head 114 and/or face are illuminated by dimly lit living room lamps, the moon, or simply the glow of a bright display screen. Glasses 106, with highly reflective frames, are distinguishable out of the darkness.

Figure 6:
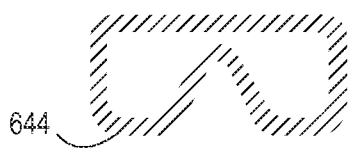
FIG. 6 illustrates glasses frames of FIG. 5 as discerned by a computer in accordance with an embodiment.

FIG. 6 illustrates glasses frames of FIG. 5 as discerned by a computer. Frame area 644 is correlated with frames 106. Frame reflectance can be starkly defined at the corners of the frames in order to enhance spatial reckoning and orientation determination of the frames.

Figure 7:
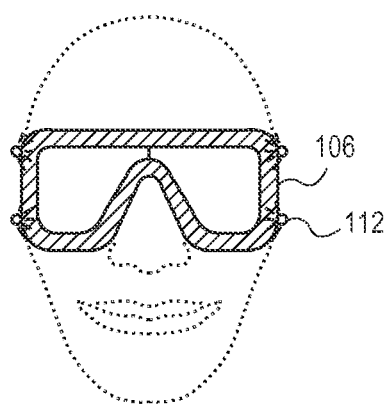
FIG. 7 illustrates a view of an unlit user's face with illuminated glasses in accordance with an embodiment.

FIG. 7 illustrates a view of an unlit user's face with illuminated glasses. The user's face is hardly visible at all, and ambient light is virtually nonexistent. Lights 112 are powered on or otherwise turned on in order to reflect off the highly reflective surfaces of 3-D glasses 106. In some embodiments, edge lit LEDs illuminate LGP within the frames of the glasses.

Figure 8:
FIG. 8 illustrates self-illuminated glasses frames of FIG. 7 as discerned by a computer in accordance with an embodiment.

FIG. 8 illustrates self-illuminated glasses frames of FIG. 7 as discerned by a computer. Frame area 644 is correlated with frames 104 that are illuminated by lights 112. The lights themselves can serve as reference points, such that areas 646 are correlated to the positions of lights 112. In some embodiments lights are small and sharply defined such that they can be readily tracked by the camera.

Figure 9:
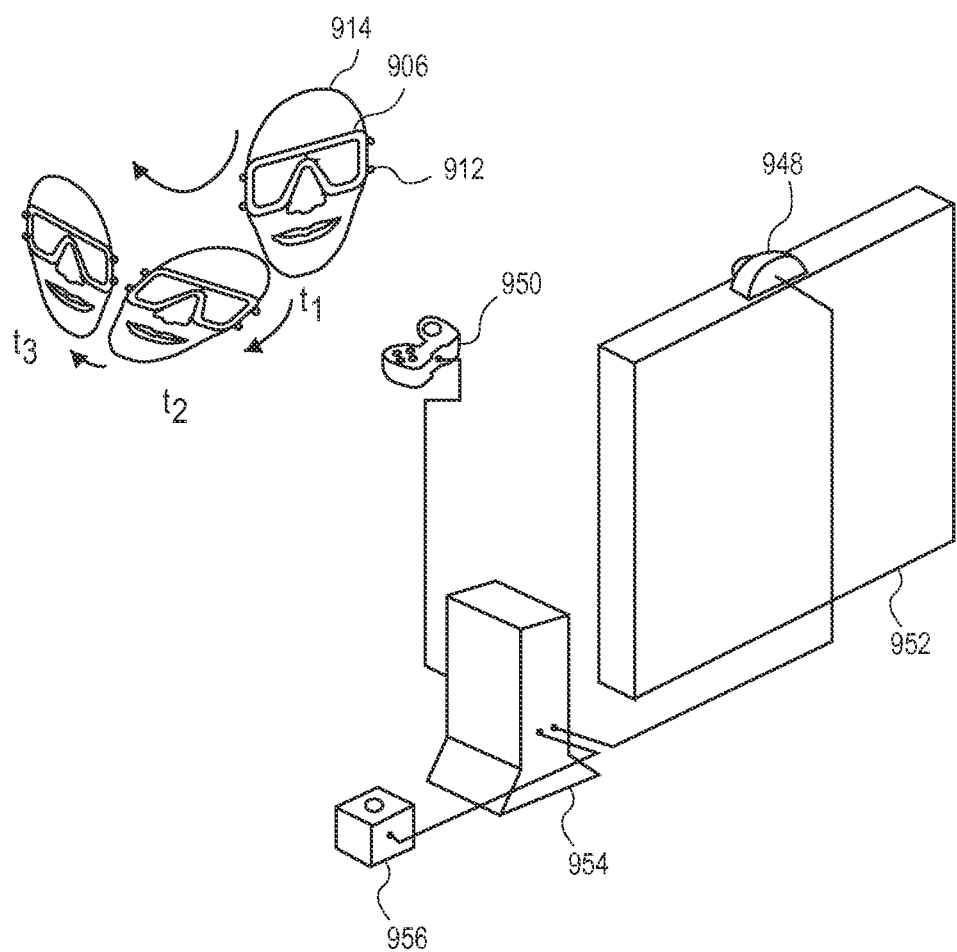
FIG. 9 illustrates head tracking for a video game console in accordance with an embodiment.

FIG. 9 illustrates head tracking for a video game console. Player's head 914 with glasses 906 is at one position and orientation at time $t_1$, another position and orientation at time $t_2$, and a further position and orientation at time $t_3$. Head 914 moves by swinging down and to the right during time period $t_1$ through $t_3$. The player can use conventional game controller 950 to play a video game and/or use only his or her body movements to control the game. Camera 948, seated in this embodiment on top of display 952, captures the user's position and movements and feeds them to game console 954. Facial tracking algorithms can be integral with camera 948 or be part of software or hardware in game console 954. In other embodiments, tracking logic can be in yet a separate device.

As the player swings his head and enjoys the game, camera 948 tracks player's head 914 using facial tracking techniques. In certain instances, however, ambient lighting may be of insufficient intensity for camera 948 to make out the facial features of the user. For example, the player or his roommates may turn out the lights and draw curtains closed to make the game experience more encompassing. Upon the light conditions deteriorating, light sensor 956, which is distinct from game console 954 and camera 948, detects or otherwise measures a lack of ambient light and sends a signal to game console 954. Game console 954 compares the measured ambient light level to a threshold value. The threshold value may be preset in the factory settings of the camera or console or be set or adjusted by the user. In its comparison, game console 954 determines that the ambient light level is beyond the threshold value. Game console 954 then shifts or otherwise switches from using facial tracking algorithms in order to track user's head 114 to glass frame tracking algorithms. The tracked head movements can be used as inputs to the game, to render 3-D images, etc.

"Beyond a threshold value" includes a value that is farther than where the threshold value delineates, whether lower than or higher than the threshold value. For example, a value of 9 is not beyond a threshold value of 10 if the threshold value establishes a ceiling or maximum. However, a value of 11 is beyond the threshold value in this threshold ceiling situation. Conversely, a value of 11 is not beyond a threshold value of 10 if the threshold of 10 establishes a floor or minimum. A value of 9 would be beyond the threshold of 10 in this threshold floor situation.

If the room gets darker still, such as if the outside light bleeding around the drawn curtains fades with twilight, light sensor 956 detects a further lack of ambient light. Light sensor 956 then sends a signal to game console 954, and game console 954 sends a (wireless) signal to glasses 906 to turn on lights 912. Depending on the amount of light needed, one, two, three, or all four lights 912 of glasses 906 can be illuminated.

In the exemplary embodiment, light sensor 956 is distinct and separate from camera 948. This can help in situations where the camera is close to the display and ambient light measured at the camera fluctuates with what the display is presenting. For example, a mostly white screen on a display can cause a camera to measure the white light emanating from the display as 'ambient' light. If the white screen is only temporary, then this can cause problems by the camera measuring too much ambient light.

In some embodiments, ambient light can be measured by camera 948, avoiding the necessity of a separate light detection device. An average or median of light detected by camera 948 can be taken as the ambient light level in a room.

In other embodiments, the tracking algorithms themselves can be used to determine if more lighting is necessary. For example, if a tracking algorithm tracks the position of a user's head with a confidence of 90% or higher, then no changes may be necessary. However, if that confidence drops to below 50%, then the algorithm can be switched or lights 912 can be illuminated. An error rate, taken as a function of the confidence of the head tracking, or as a simple frame-by-frame "error" in not recognizing a face, can be used to determine the need for more (or less) ambient light.

Lights can be located on-board the glasses, such as lights 912 on glasses 906 as shown in the exemplary embodiment, or located off-board the glasses. An example of a light located off-board the glasses is a light placed on the camera, beamed toward the user. The light can be a near-infrared light so that it is not visible to the user and thus not distracting.

Ambient lighting can grow brighter as well. For example, if a player's mother turns on the lights, the camera can be flooded with light and head tracking disturbed. In this case, light sensor 956 sends a signal to game console 954, and game console 954 sends a signal to glasses 906 to turn off its lights 912.

If there is still too much ambient light and the glasses are washed out and difficult to track, game console 954 switches from tracking the highly reflective glasses to standard facial tracking algorithms.

Figure 10:
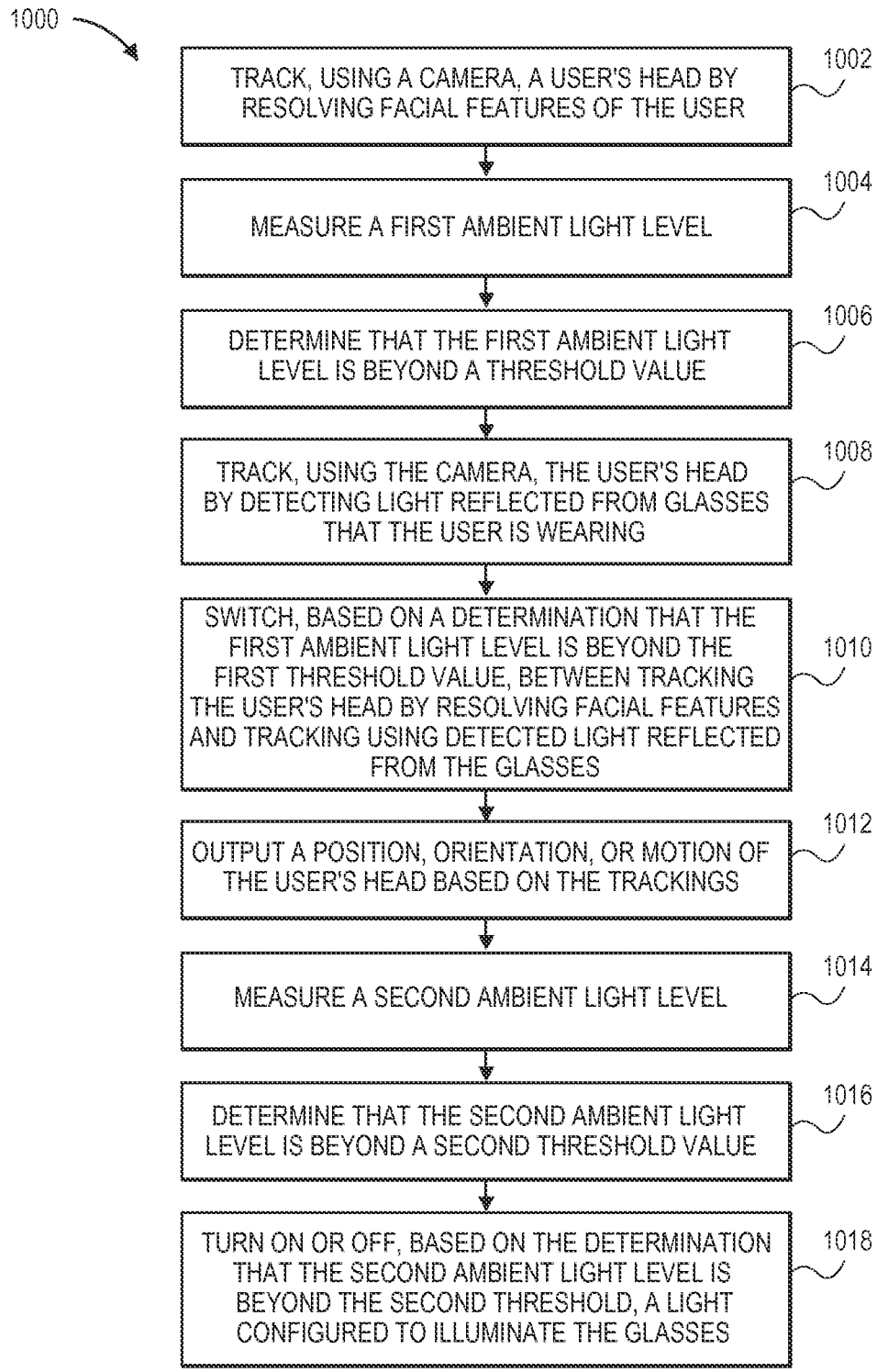
FIG. 10 is a flowchart illustrating a process in accordance with an embodiment.

FIG. 10 shows an example flowchart illustrating process 1000 in accordance with one embodiment. This process can be automated in a computer or other machine and can be coded in software, firmware, or hard coded as machine-readable instructions and run through one or more processors that can implement the instructions. In operation 1002, a user's head is tracked, using a camera, by resolving facial features of the user. In operation 1004, a first ambient light level is measured. In operation 1006, it is determined that the first ambient light level is beyond a threshold value. In operation 1008, the user's head is tracked, using the camera, by detecting light reflected from glasses that the user is wearing. In operation 1010, the tracking is switched, based on a determination that the first ambient light level is beyond the first threshold value, between tracking the user's head by resolving facial features and tracking using detected light reflected from the glasses. In operation 1012, a position, orientation, and/or motion of the user's head is output based on the trackings. In operation 1014, a second ambient light level is measured. In operation 1016, it is determined that the second ambient light level is beyond a second threshold value. In operation 1018, a light configured to illuminate the glasses is turned on or off, based on the determination that the second ambient light level is beyond the second threshold.

Figure 11:
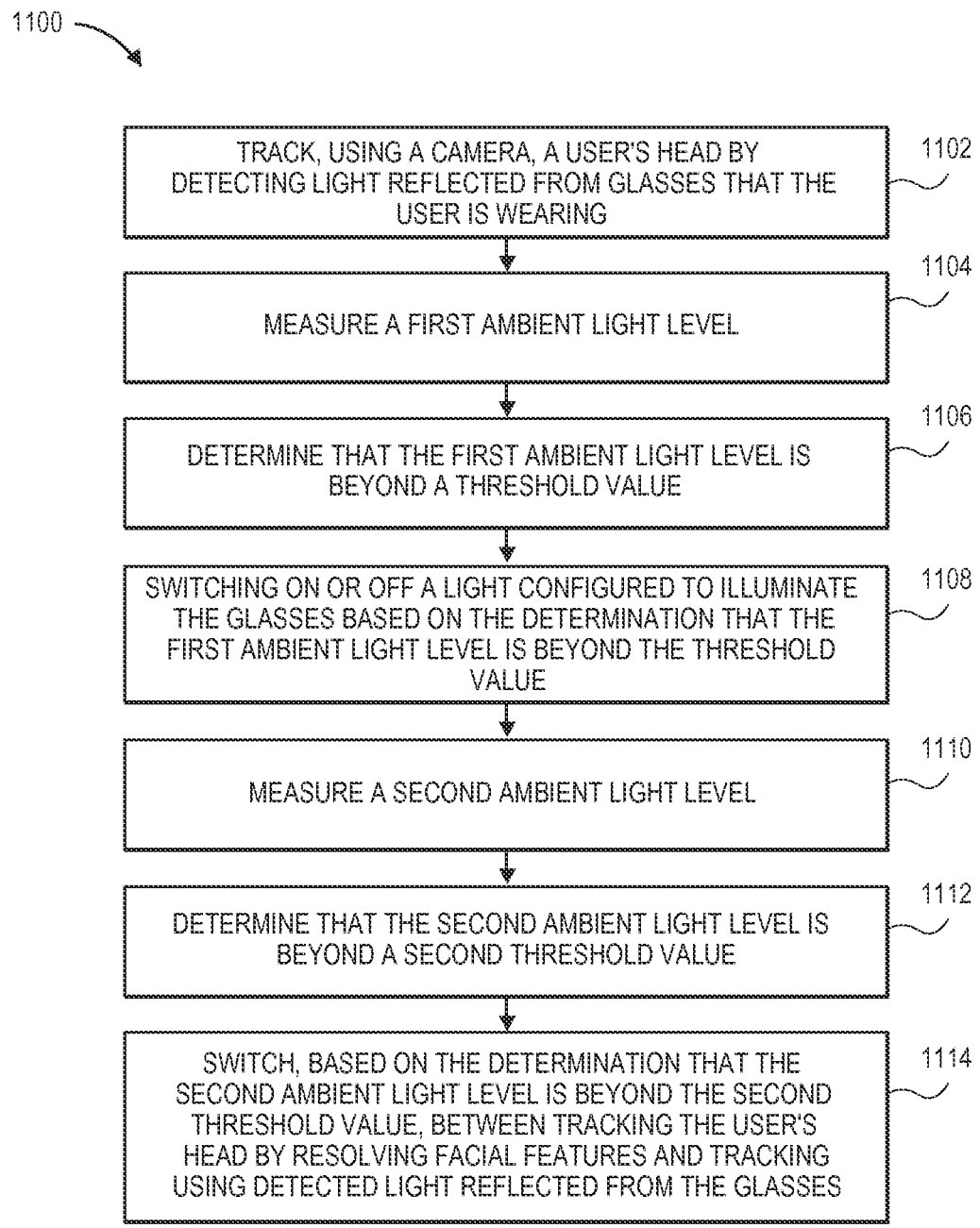
FIG. 11 is a flowchart illustrating a process in accordance with an embodiment.

FIG. 11 shows an example flowchart illustrating process 1100 in accordance with one embodiment. In operation 1102, a user's head is tracked, using a camera, by detecting light reflected from glasses that the user is wearing. In operation 1104, a first ambient light level is measured. In operation 1106, it is determined that the first ambient light level is beyond a threshold value. In operation 1108, a light configured to illuminate the glasses is switched on or off based on the determination that the first ambient light level is beyond the threshold value. In operation 1110, a second ambient light level is measured. In operation 1112, it is determined that the second ambient light level is beyond a second threshold value. In operation 1114, the tracking is switched, based on a determination that the second ambient light level is beyond the second threshold value, between tracking the user's head by resolving facial features and tracking using detected light reflected from the glasses.

The operations may be performed in the sequence given above or in different orders as applicable. They can be automated in a computer or other machine and can be coded in software, firmware, or hard coded as machine-readable instructions and run through one or more processors that can implement the instructions.

Figure 12:
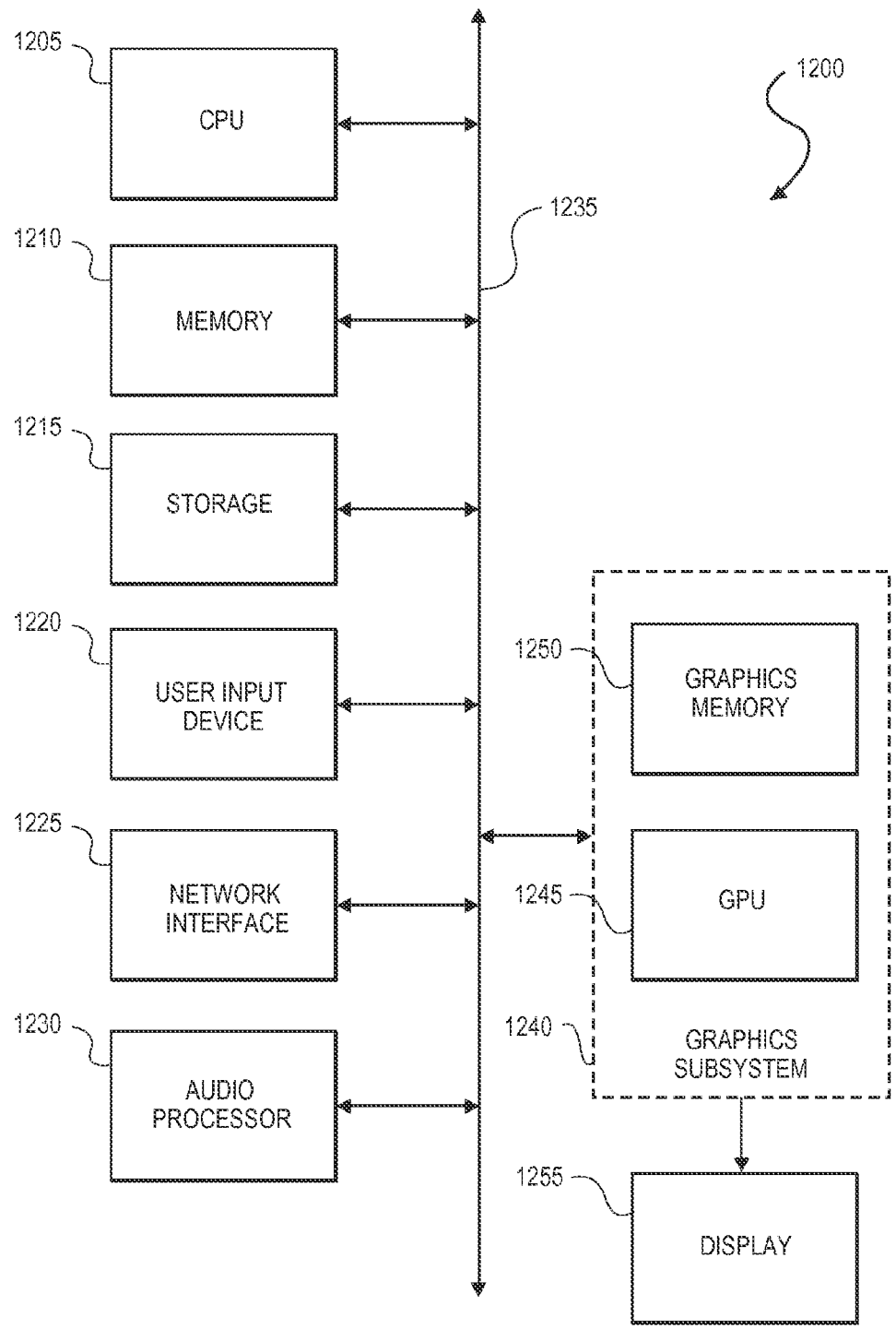
FIG. 12 is an example computer system suitable for use with embodiments of the invention.

FIG. 12 illustrates an example of a hardware system suitable for implementing a device in accordance with various embodiments. This block diagram illustrates a computer system 1200, such as a personal computer, video game console and associated display (e.g., video game console 954 and display 952 of FIG. 9), mobile device, personal digital assistant, or other digital device, suitable for practicing embodiments of the invention. Computer system 1200 includes a central processing unit (CPU) 1205 for running software applications and optionally an operating system. CPU 1205 may be made up of one or more homogeneous or heterogeneous processing cores. Memory 1210 stores applications and data for use by the CPU 1205. Storage 1215 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1220 communicate user inputs from one or more users to the computer system 1200, examples of which may include keyboards, mice, joysticks, touch pads, touch screens, still or video cameras, and/or microphones. Network interface 1225 allows computer system 1200 to communicate with other computer systems via an electronic communications network, and may include wired or wireless communication over local area networks and wide area networks such as the Internet. An audio processor 1230 is adapted to generate analog or digital audio output from instructions and/or data provided by the CPU 1205, memory 1210, and/or storage 1215. The components of computer system 1200, including CPU 1205, memory 1210, data storage 1215, user input devices 1220, network interface 1225, and audio processor 1230 are connected via one or more data buses 1235.

A graphics subsystem 1240 is further connected with data bus 1235 and the components of the computer system 1200. The graphics subsystem 1240 includes a graphics processing unit (GPU) 1245 and graphics memory 1250. Graphics memory 1250 includes a display memory (e.g., a frame buffer) used for storing pixel data for each pixel of an output image. Graphics memory 1250 can be integrated in the same device as GPU 1245, connected as a separate device with GPU 1245, and/or implemented within memory 1210. Pixel data can be provided to graphics memory 1250 directly from the CPU 1205. Alternatively, CPU 1205 provides the GPU 1245 with data and/or instructions defining the desired output images, from which the GPU 1245 generates the pixel data of one or more output images. The data and/or instructions defining the desired output images can be stored in memory 1210 and/or graphics memory 1250. In an embodiment, the GPU 1245 includes 3D rendering capabilities for generating pixel data for output images from instructions and data defining the geometry, lighting, shading, texturing, motion, and/or camera parameters for a scene. The GPU 1245 can further include one or more programmable execution units capable of executing shader programs.

The graphics subsystem 1240 periodically outputs pixel data for an image from graphics memory 1250 to be displayed on display device 1255. Display device 1255 can be any device capable of displaying visual information in response to a signal from the computer system 1200, including CRT, LCD, plasma, and OLED displays. Computer system 1200 can provide the display device 1255 with an analog or digital signal.

In accordance with various embodiments, CPU 1205 is one or more general-purpose microprocessors having one or more processing cores. Further embodiments can be implemented using one or more CPUs with microprocessor architectures specifically adapted for highly parallel and computationally intensive applications, such as media and interactive entertainment applications.

The components of the system can be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for camera tracking a user's head, the method comprising:
    measuring a first ambient light level;
    determining that the first ambient light level is beyond a first threshold value;
    tracking, using a camera, the user's head by detecting light reflected from reflective material on a device worn on the user's head, the tracking based on the determination that the first ambient light level is beyond the first threshold value; and
    outputting a position, orientation, or motion of the user's head based on the tracking.

2. The method of claim 1 further comprising:
    measuring a second ambient light level;
    determining that the second ambient light level is beyond a second threshold value;
    turning on or off, based on the determination that the second ambient light level is beyond the second threshold value, a light supported by the device configured to illuminate a portion of the device worn on the user's head; and automatically switching between tracking the user's head using the light reflected from the reflected material and tracking using the light supported by the device.

3. The method of claim 2 wherein the light supported by the device comprises a light emitting diode.

4. The method of claim 1 wherein the device worn on the user's head comprises 3-D glasses.

5. The method of claim 2 wherein the automatically switching is further based on an error rate of the tracking.

6. A method for camera tracking of a user's head, the method comprising:
measuring a first ambient light level;
determining that the first ambient light level is beyond a first threshold value;
tracking, using a camera, the user's head by controlling a light supported by a device worn on the user's head, the tracking based on the determination that the first ambient light level is beyond the first threshold level;
outputting a position, orientation, or motion of the user's head based on the tracking.

7. The method of claim 6 further comprising:
measuring a second ambient light level;
determining that the second ambient light level is beyond a second threshold value;
turning off, based on the determination that the second ambient light level is beyond the second threshold value, the light supported by the device; and
automatically switching to tracking, using the camera, the user's head by detecting light reflected from reflective material on the device.

8. The method of claim 6, wherein the light supported by the device comprises one or more light emitting diodes.

9. The method of claim 8, wherein controlling the light includes turning on and adjusting the brightness of each light emitting diode separately.

10. The method of claim 6, wherein controlling the light includes turning on or off the light supported by the device.

11. The method of claim 6, wherein the light is configured to illuminate reflective material on the device worn on the user's head.

12. The method of claim 6 wherein the device worn on the user's head comprises 3-D glasses.

* * * * *